Sept. 10, 1946. E. A. SPRIGG 2,407,583
METHOD AND APPARATUS FOR TESTING COMPRESSIBLE HARDNESS OF MATERIALS
Filed Feb. 3, 1943
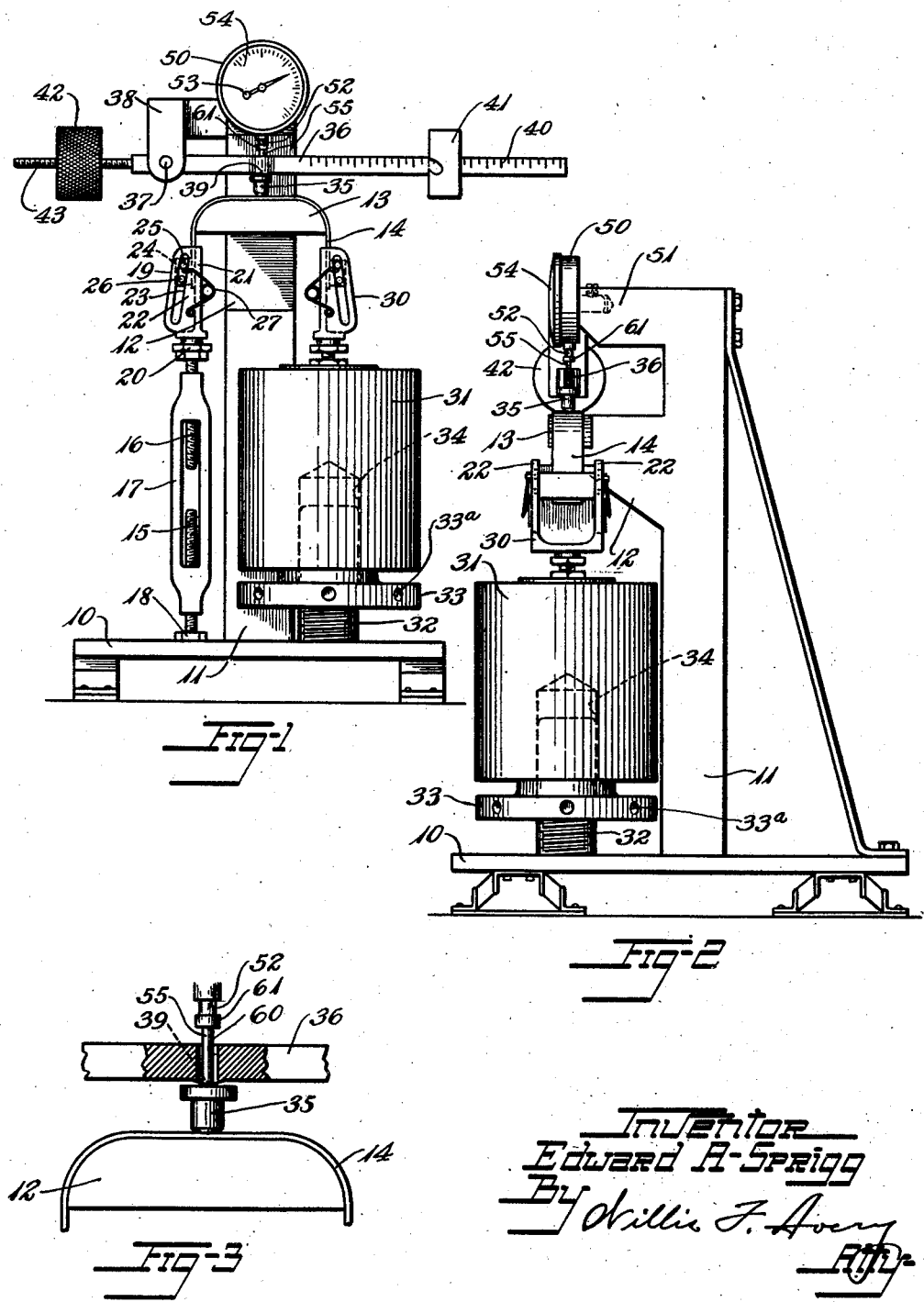
Inventor
Edward A. Sprigg
By Willis F. Avery
Atty.

Patented Sept. 10, 1946

2,407,583

UNITED STATES PATENT OFFICE 2,407,583

METHOD AND APPARATUS FOR TESTING COMPRESSIBLE HARDNESS OF MATERIALS

Edward A. Sprigg, Wadsworth, Ohio, assignor to The B. F. Goodrich Company, New York, N. Y., a corporation of New York Application February 3, 1943, Serial No. 474,557

7 Claims. (Cl. 73—81)

This invention relates to the testing of materials and is especially useful in the determination of compression hardness of articles of fabric and rubber-like composition such as printers offset blankets.

In the manufacture of printers' blankets, and especially offset blankets it has been very difficult to produce or to select from a supply blankets which would give uniform cushioning results. Such blankets are relatively thin. being generally about .0625" to .075" thick and are formed of several plies of rubberized fabric having a thin face layer of rubber or other rubber-like material, generally not over .030" thick on its working face. Due to the thinness of this facing layer, to which the compression hardness characteristics of the blankets are chiefly attributable, satisfactory measurements of compression hardness of the belt have heretofore not been obtained. Attempts to strip the surface layer and then to measure its compression hardness have also failed to give accurate results, and tests of a separate body of the same rubber composition in the form of test samples have been equally unsuccessful due to differences in preparation and vulcanization of the samples.

Instruments heretofore proposed for testing such materials, such as the Shore durometer and the extensometer have been found to lack the sensitivity necessary for the desired comparison of blankets, and in fact it has been necessary to determine the characteristics of the blanket only by actual test in operation on the offset press.

The present invention provides for testing the compression hardness of a sample while the sample is held under such tension as is encountered in use thereof, to provide for compression under known pressure over a relatively large area, to provide for measurement of compression over a large area loaded progressively from its margins toward its center. to provide great sensitivity of measurement, and to combine sensitivity of measurement with high compression loading.

These and other objects will appear from the following description and the accompanying drawing.

Of the drawing,

Fig. 1 is a front elevation of apparatus constructed in accordance with and embodying the invention.

Fig. 2 is a side elevation thereof, parts broken away and in section.

Fig. 3 is an enlarged sectional view, taken on line 3—3 of Fig. 2 showing the sample under compression.

In the illustrated embodiment of the invention, a base 10 supports a pedestal 11 having a knee bracket 12 for supporting an anvil 13 over which a sample 14 to be tested is held under tension. The anvil 13 is preferably of hardened and ground steel and has a flat horizontal upper face. The ends of the anvil are rounded through an arc of 90 degrees and considerable radius to prevent sharp bending of the sample while permitting its ends to extend downwardly.

For securing one end of the sample 14, an adjustable stay rod comprising right and left threaded rod-ends 15, 16 and a turnbuckle 17 is provided at one end of the anvil. Threaded rod end 16 is secured to the base 10 as by threaded engagement and is locked thereto by a lock nut 18. Rod end 15 has a clamp 19 secured to its upper end for engaging one end of the sample. The clamp comprises a threaded base 20 a fixed jaw 21 having parallel vertical ears 22 formed with slots 23 inclined to the fixed jaw 21. A movable jaw 24 is provided with guide pins 25, 26 fitted to slide in slots 23. A coil spring 27, of the torsion type, has one end fixed to the fixed jaw 21 and the other end fixed to movable jaw 24 and normally urges the movable jaw upwardly or toward the fixed jaw. The arrangement is such that the movable jaw may be depressed by hand pressure against the spring to provide space between the jaws to insert the end of the sample, and when released moves up the inclined slots to engage the sample. Upon pull of the sample, the jaws grip more firmly because of the inclined guide slots.

For tensioning the sample, a clamp 30, similar to clamp 19 is adapted to engage the opposite end of the sample. A large weight 31, preferably weighing 50 pounds or having weight equal to the tension per unit width of the blanket when in use, is fixed to the clamp 30. A threaded stud 32 is fixed to the base 10 vertically and a threaded collar 33 is threaded thereon. The collar has spanner holes 33a for adjusting it. The weight 31 is formed with a central clearance cavity 34 to clear the stud 32 over which it is suspended. The cavity guides the weight vertically. The collar 33 may be run up the stud to engage and support the weight 31 from the base 10 while the sample is being clamped, and may be run down to clear the weight and tension the sample.

For compressing the sample a movable block or indenting member 35 is suspended above the sample as hereinafter described. A beam 36 is pivotally supported at 37 from a bracket 38 of pedestal 11 and has a knife bearing 39 on its lower side which is positioned to bear on the center of the block 35. The beam is graduated as at 40, and a weighted rider 41 is slidable along the beam for applying presure to the block. A counter balance 42 is threaded on a threaded extension 43 of the beam for adjusting its balance.

For measuring the deflection of the block 35 under load, a dial indicator 50 is mounted on an arm 51 of the pedestal, and is of the type having a movable plunger 52, the movements of which are indicated by movement of a rotating hand 53 over a dial 54. The dial may be rotated by hand to zero setting and further movement of the plunger read directly, usually in one-ten-thousandths of an inch. The block 35, previously mentioned is fixed to a reduced end 55 of the plunger, the reduced portion extending through a clearance opening 60 through the beam 36. The plunger has a shoulder 61 above the beam adapted to lift the block 35 from the sample when the beam 36 is raised.

For providing for progressive compression over a progressively increasing area, the lower face of the block or indenting member 35 which engages the sample is made at least one-half inch in diameter and of rounded or convex form of great radius, preferably over four inches, a face of 4½ inch radius having been found desirable as this approximates the curvature of rolls engaging an offset blanket in use. With a block or indenting member having a face of such size and curvature a total compressive movement of .003" will be maximum under 50 lbs. pressure over the range of compression found in offset blanket facings, and this movement will cause less penetration than the total depth of curvature of the block which is very desirable as it provides zero pressure at the margin of the depressed area increasing progressively toward the center of the depression. Such a slight total depression under a heavy load is desirable due to the thinness of the face layer to be tested, and the tests may be conducted under pressures encountered in use and under tension of the belt encountered in use, while at the same time wide deflections of the dial indicator hand are possible with very slight compressive movement, a condition providing great accuracy of determination of compressive hardness. Also a long beam provided with one ounce graduations provides fine readings of pressure with small penetration.

In use, the beam 40 and block 35 are lifted by any convenient means (not shown). The clamp jaws 24 are depressed while the ends of a sample, about one inch wide, are inserted in the clamp, the weight 31 being supported by the screw collar 23. The screw collar 23 is then lowered to tension the sample. As tension in use of an offset blanket is usually fifty pounds per inch width, a fifty pound weight is applied to a one inch strip. Beam 36 and block 35 are then lowered with the block against the sample. The rider 41 is adjusted so as to apply a load of one ounce and the dial indicator is set at zero. The one ounce pressure, as a minimum load, has been found to give more reliable readings than where readings are taken at zero pressure. Then the load is increased by moving the rider 41 until a deflection of not over .003" is indicated by the dial indicator, and the applied load is read from the beam at such deflection. In preferred practice readings are taken at one, two, and three one-thousandths of an inch and the load as indicated in ounces on the beam is taken as a measure to compare samples. However by computing the area depressed, the load per square inch may be figured from this reading if desired. Samples of different blankets may be accurately compared by comparing the loads necessary to produce the same amount of deflection thereof while the samples are under the same tension. While the face of the block 35 is preferably of convex spherical form, blocks having flat faces or faces of other shapes may be employed.

Variations may be made without departing from the scope of the invention as it is defined by the following claims.

I claim:

1. Apparatus for testing the compressible hardness of resilient sheet material under tension, said apparatus comprising a support for a sample of sheet material, static means for tensioning the sample across the support, means for locally applying a compression load against the material backed by said support, and means at the load applying position for measuring the depression of the tensioned material under said load.

2. Apparatus for testing the compressible hardness of resilient sheet material under tension, said apparatus comprising a support for a sample of sheet material, static means for tensioning the sample across the support, and means at the load applying position including a rounded loading member for locally applying a constant compression load against the material backed by said support, and means for measuring the depression of the tensioned material under a load.

3. Apparatus for testing the compressible hardness of resilient sheet material under tension, said apparatus comprising a support for a sample of sheet material, static means for tensioning the sample across the support, and means at the load applying position including a spherical-faced member for locally applying a constant compression load against the material backed by said support, and means for measuring the depression of the tensioned material under a load.

4. Apparatus for testing the compressible hardness of resilient sheet material under tension, said apparatus comprising a support for a sample of sheet material, static means for tensioning the sample across the support, and means at the load applying position including a spherical-faced member of over four inch radius for locally applying a constant compression load against the material backed by said support, and means for measuring the depression under a load.

5. Apparatus for testing the compressible hardness of resilient sheet material, said apparatus comprising a support for a sample of sheet material, static means for tensioning the material under constant load across a face of the support and against said face, an indenting member opposite the support having a convex face, means for indicating movement of the indenting member with relation to the material, means for applying a constant load to the indenting member to press the same against the material backed by said face of the support, and means for measuring the load corresponding to the amount of indentation.

6. Apparatus for testing the compressible hardness of an offset blanket or the like, said apparatus comprising a support for a sample of the material, means for tensioning the sample longitudinally thereof and against said support by an amount equal to the tension of the article in use, an indenting member having a broad spherical face approximating in radius the radius of a roll contacting the article under pressure in use of the article, means for applying a load to the indenting member to indent the face of the sample backed by said support means for indicating the amount of movement of the indenting member, and means for measuring the load corresponding to the amount of indentation.

7. The method of testing the compressible hardness of an offset blanket or the like which comprises supporting a sample of the material, tensioning the material across the support under a static load by an amount substantially equal to the tension of the article in use, applying an indenting force to the exposed face of the sample backed by said support through an indenting member having a convex face approximating in curvature the curvature of a roll contacting with the article in use, said force being sufficient to accomplish a determinate indentation, and measuring the load applied to accomplish indentation at the support.

EDWARD A. SPRIGG.